United States Patent Office 3,070,573
Patented Dec. 25, 1962

3,070,573
METHOD OF GRAFTING OLEFINS ONTO ORGANOSILICON COMPOUNDS BY THE USE OF OZONE
Henry Nelson Beck, Midland, Mich., assignor to Dow Corning Corporation, Midland, Mich., a corporation of Michigan
No Drawing. Filed Aug. 18, 1958, Ser. No. 755,440
3 Claims. (Cl. 260—45.5)

This invention relates to the grafting of olefins onto organosilicon compounds with ozone.

It is the object of this invention to provide a novel method for modifying organosilicon compounds in order to improve specific properties such as solvent resistance and in order to increase the polar forces between the molecules so as to give resins and elastomers of greater mechanical strength. Another object is to provide a method for modifying organosilicon compounds without the necessity of employing expensive intermediates. Other objects and advantages will be apparent from the following description.

This invention relates to a method of grafting organic vinylic compounds onto organosilicon compounds which comprises contacting an organosilicon compound in which at least .001 mol percent of the silicon atoms have at least one unsaturated non-aromatic hydrocarbon group attached thereto through silicon-carbon bonds and in which organosilicon compound the remaining valences of the silicon atoms are satisfied by saturated hydrocarbon radicals, saturated halogenated hydrocarbon radicals, oxygen atoms of SiOSi linkages, halogen atoms and groups of the formula —OR where R is a saturated hydrocarbon or saturated halogenated hydrocarbon radical, with ozone at a temperature not greater than 30° C. and thereafter contacting the treated siloxane with an olefin having a terminal group of the formula

in which X is hydrogen or halogen, said olefin having less than 12 carbon atoms in the molecule and being of the group esters, acids, hydrocarbons, halohydrocarbons, ethers, thioethers, amides, nitriles, ketones and aldehydes, at a temperature above 30° C.

As can be seen the process of this invention is carried out in two steps. In the first step the siloxane is contacted with ozone at a temperature not above 30° C. If the contacting is carried out above 30° C. in this step, the reactive sites on the organosilicon compound will deteriorate. The lower limit of the temperature is not critical but it is preferable that it be above —100° C.

The physical state of the organosilicon compound in the first step is not critical. Thus, the organosilicon compound can be in the form of a liquid, a resin, or a rubbery elastomeric material. Furthermore, the organosilicon compound can be in the form of a monomeric silane, a polymeric siloxane or a silcarbane. If the organosilicon compound is polymeric, it can be either homopolymeric or copolymeric.

In all cases at least .001 mol percent of the silicon atoms in the organosilicon compound must have at least one unsaturated non-aromatic hydrocarbon radical attached thereto. Apparently the ozone attacks the unsaturated radical forming a reactive site at the point of the unsaturaetd carbon-carbon linkages, which reactive site thereafter reacts with the olefin to form a graft. For the purpose of this invention the size of the unsaturated non-aromatic hydrocarbon radical is not critical, nor is the position of the unsaturated linkage within the radical critical. Furthermore, the unsaturated radical may contain more than one unsaturated linkage and the unsaturated linkages can be in the form of either double bonds or triple bonds.

Thus, it can be seen that for the purpose of this invention the unsaturated non-aromatic hydrocarbon groups attached to the silicon can be either alkenyl groups such as vinyl, allyl, hexenyl, butadienyl, ethynyl, octadecenyl-1, octadecenyl-9, or unsaturated cycloalkyenyl groups such as cyclohexenyl, vinylcyclohexyl and cyclopentadienyl.

It is essential that the organosilicon compound contain at least .001 mol percent of the silicon atoms having the above unsaturated non-aromatic hydrocarbon groups attached thereto. However, there is no upper limit to the number of such groups attached to the silicon. Thus, each silicon atom in the organosilicon compound can have from 1 to 4 of said groups attached thereto. Specific examples of such compounds are tetravinylsilane, diallyldichlorosilane, allylmethylsiloxane, divinylsiloxane, hexavinyldisiloxane and monovinylsilioxane.

Alternatively, the organosilicon compound may contain silicon atoms which do not have any of the unsaturated non-aromatic hydrocarbon groups attached thereto. For example, the organosilicon compounds employed herein may be mixtures of dimethyldichlorosilane and vinylmethyldichlorosilane; diethyldiethoxysilane and diallyldiethoxysiloxane or copolymers of vinylmethylsiloxane and dimethylsiloxane; vinylmethylsiloxane and trifluoropropylmethylsiloxane; and monovinylsiloxane, monocyclohexylsiloxane and cyclohexylmethylsiloxane. Furthermore, the organosilicon composition can be a silcarbane such as, for example, one of the formulae

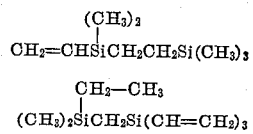

or

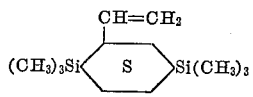

Specific examples of the monovalent saturated aliphatic and cycloaliphatic hydrocarbon radicals which can be attached to the organosilicon compounds employed in the method of this invention are alkyl radicals such as methyl, ethyl, octadecyl, t-butyl and myricyl; and cycloaliphatic hydrocarbons such as cyclohexyl, cyclopentyl and methylcyclohexyl. Specific examples of operative polyvalent saturated aliphatic and cycloaliphatic hydrocarbon radicals are methylene, dimethylene, tetramethylene, octadecamethylene and 1-methyltrimethylene, cyclohexylene, cyclopentylene and methylcyclohexylene together with trivalent saturated hydrocarbon radicals such as

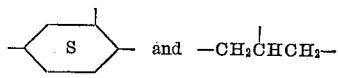

in which each of the valence bonds is attached to a silicon atom.

Specific examples of the halogen groups which can be attached to the silicon atoms are bromine, fluorine, chlorine and iodine and specific examples of OR groups are ethoxy, methoxy, isopropoxy, octadecoxy, cyclohexyloxy and cyclopentyloxy. For the purpose of this invention the saturated hydrocarbon radicals and the OR groups can also be halogenated. Specific examples of such groups are chloromethyl, trifluoropropyl, chloropropyl, iodocyclohexyl, α-chloromethylcyclopentyl, bromomethyl, chloroethoxy, fluoroethoxy and bromocyclohexyloxy.

In carrying out the second step of this invention the siloxane which has been contacted with ozone is then brought into contact with any of the defined olefins in any desirable manner. If desired, a mixture of two or more of the defined olefins can be used. The time of contacting with the ozone is not critical although in general the longer the contact time between the ozone and the siloxane the more extensive will be the grafting in the second step.

The treated siloxane and the olefin can be brought together in any desirable manner. For example, when the siloxane and olefin are both fluids they may simply be mixed. When the siloxane is a solid, it may be immersed in the olefin. If desired, a solvent may be employed. Suitable solvents include those which are saturated and preferably those which are inert to ozone such as carbon tetrachloride, perchloroethane and fluid siloxanes in which the substituents on the silicon are all saturated radicals such as methyl, ethyl, cyclohexyl and the like.

After the organosilicon compound and the olefin have been brought into contact they are then heated at a temperature above 30° C. This causes the olefin to graft onto the reactive sites of the unsaturated groups on the silicon. The temperature of the reaction is not critical as long as it is above 30° C. although the rate and extent of grafting will be higher as the temperature is raised. The time of contact between the olefin and the organosilicon compound is not critical although obviously the longer the contact time the greater will be the extent of grafting.

After the grafting is complete any hydrolyzable groups on the silicon atom may be removed if desired by hydrolyzing with water under conventional conditions. This will convert the grafted organosilicon compound into a siloxane.

Operative olefins for the purpose of this invention include any hydrocarbon having a terminal double bond such as ethylene, propylene, styrene, vinyltoluene, butadiene, divinylbenzene, and isobutylene; esters such as vinylacetate, methylmethacrylate, butylmethacrylate, vinylpropionate, diallylphthalate and allylacetate; acids such as acrylic acid, methacrylic acid, vinylacetic acid, vinylbenzoic acid and allylcyclohexoic acid; halohydrocarbons such as tetrafluoroethylene, chlorotrifluoroethylene, trifluoropropene, vinylchloride, allylchloride and vinylbromide; ethers such as divinylether, methylvinylether and the allylmethylether of ethylene glycol, the allylmethylether of dipropylene glycol and vinylcyclohexylether; thioethers such as allylmethylsulfide, diallylsulfide, and cyclohexylvinylsulfide; amides such as acrylamide, methacrylamide and $CH_2=CHCH_2CH_2CONH_2$; nitriles such as acrylonitrile, methacrylonitrile, allylnitrile and butenylnitrile; ketones such as vinylmethylketone, allylmethylketone, diallylketone and allylacetone; and aldehydes such as acrolein and hexenylaldehyde.

If desired, the compositions of this invention can be modified by incorporating in the reactive olefins described above, olefins having the unsaturated linkage in a non-terminal position. These latter olefins do not graft to the organosilicon compound by themselves, but will form cografts with the terminally unsaturated olefins where the two are mixed and reacted with the activated organosilicon compound. Examples of such modifying olefins are acids such as maleic acid, maleic anhydride, crotonic acid and oleic acid together with their corresponding esters, nitriles, amides and aldehydes and ketones such as ethylidene acetone and mesityl oxide.

The graft compositions of this invention are useful in the manufacture of rubbers, resins and fluids which are useful for electrical insulation, solvent resistant hoses and protective coatings.

The following examples are illustrative of this invention but should not be construed as limiting the scope thereof which is properly delineated in the appended claims.

In the specification the following abbreviations are employed: Me for methyl, Et for ethyl and Vi for vinyl.

*Example 1*

50 g. of a copolymeric gum composed of 96 mol percent dimethylsiloxane and 4 mol percent methylvinylsiloxane were mixed with 17.5 g. of a fume silica and 5 ml. of a hydroxylated dimethylpolysiloxane fluid. The latter was added to prevent crepe aging of the sample. The sample was pressed into a sheet 1/32 inch thick and then subjected to oxygen containing 1% by volume ozone for 1.7 hours at 25° C. The sample was immediately immersed in 50 ml. monomeric acrylonitrile and allowed to stand at room temperature for .86 hour. The mixture was then heated to reflux and maintained in this condition for 4.8 hours. The grafted sample was then removed from the acrylonitrile and dried and then subjected to boiling dimethylformamide for 1.8 hours. This treatment was for the purpose of removing any acrylonitrile homopolymer from the mixture.

After removal from the dimethylformamide the sample was extracted with toluene to remove low molecular weight siloxanes and then analyzed. It was found to contain 15% by weight nitrogen and 7.5% by weight silicon. This proves that the sample was a graft copolymer containing both siloxane and acrylonitrile units.

*Example 2*

The polysiloxane gum sample of Example 1 was subjected to oxygen containing 1% by volume ozone for 4.7 hours at 25° C. The sample was then removed from the ozone and immediately placed in monomeric styrene and the mixture was then heated on a steam bath for 16 hours. The resulting sample was immersed in toluene at 25° C. for 28.6 hours. This was for the purpose of removing homopolymeric styrene. The sample was then dried and analyzed and found to contain 23.15% by weight silicon and 48.7% by weight carbon. This shows that the styrene was grafted to the siloxane since the original siloxane composition contained 40.4% silicon and 19.8% carbon.

*Example 3*

The siloxane composition of Example 1 was subjected to oxygen containing 1% by volume ozone at 25° C. for 4.7 hours. The sample was then immediately placed in monomeric vinylacetate and heated on a steam bath for 16 hours. The grafted sample was then immersed in toluene at 25° C. for 26 hours to remove ungrafted vinylacetate. The sample was then removed from the toluene, dried and analyzed and found to contain 32.4% silicon and 28.5% carbon. By contrast, the original siloxane composition contained 41.1% silicon and 18.4% carbon.

*Example 4*

2 g. of a polysiloxane gum composed of 98 mol percent dimethylsiloxane and 2 mol percent methylvinylsiloxane were dissolved in 150 ml. of carbon tetrachloride and oxygen containing 1% by volume ozone was bubbled through the solution for 33 minutes at 25° C. During the passage of the gas the volume was maintained at 150 ml. by the addition of more carbon tetrachloride. The ozone was then flushed from the solution with a steam of oxygen for 20 minutes. A solution of 10 ml. of distilled acrylonitrile in 10 ml. of carbon tetrachloride was then added to the solution and the mixture was heated on a steam bath for 5 hours. The solvent was removed and the residue was dried. The dried sample was an amber colored gel-like material. It was extracted with boiling dimethylformamide for 1 hour and 28 minutes to remove homopolymeric acrylonitrile. The sample was removed from the solvent and dried. The sample was then extracted with toluene at room temperature for 24 hours. It was then dried and analyzed and found to contain 1.4% nitrogen and 33% silicon.

This proves that the acrylonitrile was grafted onto the siloxane.

*Example 5*

A solution of 10.9 g. of a copolymer gum of 92 mol percent dimethylsiloxane and 8 mol percent methylvinylsiloxane dissolved in 200 ml. of hexamethyldisiloxane was cooled to −16° C. and 1% ozone in oxygen was passed through the solution. The solution was then purged with nitrogen to remove excess ozone. The resulting solution was then mixed with 35.7 g. of vinylchloride and 15 ml. additional hexamethyldisiloxane. The mixture was heated in a bomb at 100° C. for 4 hours and then at 125° C. for ⅓ hour. The product was then cooled and the solvent removed to give a cross linked rubbery material containing 2.8% by weight chlorine which corresponds to 4.8% grafted vinylchloride.

*Example 6*

The siloxane solution of Example 5 was cooled to −24° C. and treated with 1% ozone. The solution was then purged with nitrogen and 57.9 g. of 1,1,1-trifluoropropene and 50 ml. of hexamethyldisiloxane were added. The solution mixture was heated in a bomb at 150° C. for 43 hours. The solvent was then removed and the resulting product was a pale yellow material which contained 1.5% by weight fluorine.

*Example 7*

The siloxane solution of Example 5 was cooled to −25° C. and then treated with 1% ozone as shown in that example. The solution was purged with nitrogen and there was added thereto a solution of 13 g. of acrylamide in 30 ml. of ethanol slowly with rapid stirring. The mixture was heated at 51° C. for 5 hours and then at 40° C. for 18½ hours. The resulting product was extracted with water and hexamethyldisiloxane was removed. The product was a rubbery material containing 1.77% by weight nitrogen.

*Example 8*

The siloxane solution of Example 5 was treated with 1% ozone at −26° C. The resulting product was purged with nitrogen and there was added thereto 33.3 g. of acrolein stabilized with hydroquinone and 50 ml. of hexamethyldisiloxane. The product was heated in a bomb at 100° C. for 4 hours and then at 125° C. for 1 hour. The solvent was removed and the product was a crosslinked gum which was extracted with acetone. The acetone insoluble fraction was found to contain 31.25% silicon which corresponds to a 17.4% by weight grafted acrolein.

*Example 9*

The siloxane solution of Example 5 was reacted with 1% ozone at −22° C. The solution was purged of ozone with nitrogen and was mixed with 58.3 g. of chlorotrifluoroethylene and 50 ml. of hexamethyldisiloxane, and the mixture heated at 110° C. in a bomb for 4 hours and at 125° C. for 64 hours. The product was a grease-like material which contained 24.2% fluorine.

*Example 10*

The siloxane solution of Example 5 was treated with ozone at −20° C. The ozone was removed from the solution with nitrogen and the ozonated solution was mixed with 33 g. of chlorotrifluoroethylene, 12.1 g. of acrylonitrile and 50 ml. of hexamethyldisiloxane. The mixture was heated in a bomb at 125° C. for 22 hours. The solvent was removed under reduced pressure and the resulting product was a viscous fluid that cross linked slowly upon standing at room temperature. It contained 3.5% nitrogen and 1.5% fluorine which showed that both acrylonitrile and the chlorotrifluoroethylene were grafted onto the siloxane.

*Example 11*

The siloxane solution of Example 5 was reacted at −23° C. with 1% ozone. The solution was purged with nitrogen and mixed with 23.4 g. of pure acrylic acid. The mixture was heated on a steam bath for 2 hours. The solvent was removed and the product was a hard, white, brittle solid which was extracted with acetone. The acetone insoluble fraction was a hard, translucent, granular, material containing 9.4% silicon which corresponded to 75% by weight grafted acrylic acid. This material was completely soluble in 5% aqueous sodium hydroxide.

*Example 12*

A mixture of 100 parts by weight of the siloxane of Example 5, 35 parts of a fume silica and 10 parts of a fluid hydroxylated dimethylsiloxane were pressed into sheets 1/64 inch thick. The sheets were treated with a stream of 1% ozone in oxygen at room temperature at a flow rate of 16.5 liters per hour for 1 hour. The ozonated sheet was placed in methylacrylate containing .1% of the methylether of hydroquinone. The mixture was allowed to stand at room temperature for .43 hour and then heated at reflux for 3.25 hours. The product was extracted with toluene and the toluene insoluble product contained 35.5% silicon. A similar sheet which had not been grafted contained 38.5 silicon. This shows that methylacrylate had been grafted onto the siloxane.

*Example 13*

The siloxane sheet of Example 12 was treated with 1% ozone in oxygen at 25° C. for 1.3 hours at a flow rate of 18 liters per hour. The ozonated sheet was placed in methacrylonitrile at room temperature for 15 minutes and then refluxed for .74 hour. The dried sample contained .7% nitrogen which corresponds to 3.35% grafted methacrylonitrile. A similar sample which was in the hot olefin for 1.55 hours contained 2.3% nitrogen or 11.1% grafted methacrylonitrile.

*Example 14*

The siloxane sheet of Example 12 was treated with 1% ozone in oxygen at 25° C. for 1.33 hours at a flow rate of 18 liters per hour. The ozonated sheet was placed in pure methyl methacrylate at room temperature for 15 minutes, and then the mixture was refluxed for .38 hour. The dried sample contained 22.6% silicon as compared with a blank of 41.4% silicon.

*Example 15*

The siloxane sheet of Example 12 was treated with 1% ozone in oxygen at 25° C. for 1.33 hours at a flow rate of 18 liters per hour. The ozonated sample was placed in pure diallyl itaconate at room temperature for 15 minutes and then heated at 100° C. for 3.6 hours. The sample was dried and found to have gained 5.7% in weigh and contained 32.75% silicon. The blank contained 38.4% silicon.

*Example 16*

The siloxane sheet of Example 12 was treated with ozone in accordance with the procedure of Example 15. The ozonated sample was placed in diallyl cyanamide at room temperature for 15 minutes and then heated at 100° C. for 3.5 hours. After drying the grafted sample contained .05% nitrogen which corresponds to .22% grafted cyanamide. A control sample which was similarly treated but which had no ozone in contact therewith contained no nitrogen.

*Example 17*

Grafting occurs when the following organosilicon compounds are dissolved in carbon tetrachloride and the solution is reacted with 1% ozone in accordance with the procedure of Example 5 and the resulting solution is mixed with the following olefins and thereafter heated on a steam bath for 5 hours.

| Organosilicon Compound | Olefin |
|---|---|
| 1. Vinylmethylpolysiloxane gum | Allylmethylether of diethylene glycol. |
| 2. $CH_2=CH(CH_3)_2SiO[\overset{\overset{\displaystyle CH_3-CH_3}{\vert}}{\underset{\underset{\displaystyle CH_3}{\vert}}{Si}}O]_{10}Si(CH_3)_2CH=CH_2$ | Diallylsulfide. |
| 3. Copolymer of 1 mol percent monovinylsiloxane, 9 mol percent dipropylsiloxane, 30 mol percent monooctadecylsiloxane, 60 mol percent monomethylsiloxane. | Vinylmethylketone. |
| 4. Tetravinylsilane | $CH_2=\overset{\overset{\displaystyle CF_3}{\vert}}{C}(CH_2\overset{\overset{\displaystyle CF_3}{\vert}}{C}H)_2H$ |
| 5. $CH_3CH_2=CHSiCl_2$ | Acrylonitrile. |
| 6. $CH_3CH_2=CHSi(OCH_2CH_3)_2$ | Do. |
| 7. Copolymer of 95 mol percent $\overset{\overset{\displaystyle CH_3}{\vert}}{CF_3CH_2CH_2Si}O$ and 5 mol percent vinylmethylsiloxane | Do. |
| 8. 3-cyclohexenylmethylsiloxane | Do. |
| 9. $CH\equiv C\overset{\overset{\displaystyle CH_3}{\vert}}{S}i(OCH_2CH_2Cl)_2$ | Do. |
| 10. $CH_2=CH\overset{\overset{\displaystyle CH_3}{\vert}}{\underset{\underset{\displaystyle CH_3}{\vert}}{Si}}CH_2CH_2\overset{\overset{\displaystyle CH_3}{\vert}}{\underset{\underset{\displaystyle CH_3}{\vert}}{Si}}CH=CH_2$ | Do. |
| 11. $CH_3CH_2=CHSiFBr$ | Do. |
| 12. $CH_2=CHCH=CHSi(OC_2F_5)_3$ | Do. |
| 13. $C_8H_{17}CH=CH(CH_2)_8\overset{\overset{\displaystyle C_{18}H_{37}}{\vert}}{Si}O$ | Do. |
| 14. $CH_2=CH\overset{\overset{\displaystyle C_6H_{11}}{\vert}}{\underset{}{}}$$SiO$ | Do. |
| 15. Copolymer of 10 mol percent chloromethylmethylsiloxane, 20 mol percent cyclopentylmethylsiloxane, 1 mol percent trivinylsiloxane and 69 mol percent dimethylsiloxane. | Do. |
| 16. Vinylmethylpolysiloxane | $CFCl=CFCl$ |
| 17. Vinylmethylpolysiloxane | Vinylbromide. |
| 18. $-(CH_3)_2Si\overset{\overset{\displaystyle CH=CH_2}{\vert}}{}$ S $Si(CH_3)_3$ | Acrylonitrile. |

That which is claimed is:

1. A method of grafting organic vinylic compounds onto organosilicon compounds which comprises (1) contacting an organosilicon compound in which at least .001 mol percent of the silicon atoms have unsaturated non-aromatic hydrocarbon radicals attached thereto by carbon-silicon linkages, any remaining valences of the silicon atoms in said organosilicon compound being satisfied by substituents of the group consisting of saturated hydrocarbon radicals, saturated halogenated hydrocarbon radicals, oxygen atoms of an SiOSi linkage, halogen atoms and —OR groups in which R is of the group consisting of saturated hydrocarbon radicals and saturated halogenated hydrocarbon radicals, with ozone at a temperature not greater than 30° C. and (2) thereafter contacting the treated organosilocon compound with an olefinic compound having a terminal group of the formula $$CX_2=\overset{\vert}{C}-$$

in which X is selected from the group consisting of hydrogen and halogen, said olefinic compound containing less than 12 carbon atoms per molecule and being selected from the group consisting of esters of carboxylic acids, carboxylic acids, hydrocarbons, halohydrocarbons, ethers, thioethers, amides, nitriles, ketones and aldehydes at a temperature above 30° C.

2. The method in accordance with claim 1 in which the organosilicon compound is a methylvinylsiloxane and in which the olefinic compound is an acrylonitrile.

3. The method in accordance with claim 1 in which the organosilicon compound is a methylvinylsiloxane and in which the olefinic compound is a fluorinated olefin.

References Cited in the file of this patent

UNITED STATES PATENTS

| 2,438,612 | MacKenzie et al. | Mar. 30, 1948 |
| 2,803,616 | Clark | Aug. 20, 1957 |
| 2,837,496 | Vandenberg | June 3, 1958 |

FOREIGN PATENTS

| 1,101,682 | France | Apr. 27, 1955 |
| 1,161,824 | France | Mar. 31, 1958 |
| 562,661 | Belgium | May 27, 1958 |